(12) United States Patent
Ishikawa et al.

(10) Patent No.: US 9,977,270 B2
(45) Date of Patent: May 22, 2018

(54) OPTICAL DEVICE

(71) Applicant: SUMITOMO OSAKA CEMENT CO., LTD., Tokyo (JP)

(72) Inventors: Yoshizumi Ishikawa, Tokyo (JP); Youichi Hosokawa, Tokyo (JP); Masayuki Motoya, Tokyo (JP); Satoshi Oikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days. days.

(21) Appl. No.: 15/515,098

(22) PCT Filed: Sep. 30, 2015

(86) PCT No.: PCT/JP2015/077759
§ 371 (c)(1),
(2) Date: Mar. 28, 2017

(87) PCT Pub. No.: WO2016/052630
PCT Pub. Date: Apr. 7, 2016

(65) Prior Publication Data
US 2017/0227798 A1    Aug. 10, 2017

(30) Foreign Application Priority Data
Sep. 30, 2014  (JP) ................. 2014-202162

(51) Int. Cl.
*G02F 1/03* (2006.01)
*G02F 1/035* (2006.01)
(Continued)

(52) U.S. Cl.
CPC .............. *G02F 1/0316* (2013.01); *G02F 1/01* (2013.01); *G02F 1/0356* (2013.01); *G02F 1/065* (2013.01);
(Continued)

(58) Field of Classification Search
CPC ...... G02F 1/0316; G02F 1/065; G02F 1/0356; G02F 2202/20; G02F 2201/46; G02F 1/313; G02F 1/01; G02F 1/12
See application file for complete search history.

(56) References Cited

U.S. PATENT DOCUMENTS

2005/0013522 A1*   1/2005   Doi .................. G02F 1/0121
385/3

FOREIGN PATENT DOCUMENTS

JP      2003-121888 A      4/2003
JP       2003121888 A  *   4/2003
(Continued)

OTHER PUBLICATIONS

International Search Report for PCT/JP2015/077759 (dated Dec. 8, 2015).

*Primary Examiner* — Ryan Lepisto
*Assistant Examiner* — Erin Chiem
(74) *Attorney, Agent, or Firm* — Merchant & Gould P.C.

(57) ABSTRACT

An optical device is provided, which includes: an optical waveguide provided in a substrate having an electro-optic effect; a signal electrode provided on the substrate and above the optical waveguide; and a peeling prevention film which is provided on at least a part of an outer peripheral portion of the substrate and at a position spaced apart from the signal electrode, and also serves as a ground electrode.

7 Claims, 3 Drawing Sheets

(51) Int. Cl.
  *G02F 1/065* (2006.01)
  *G02F 1/01* (2006.01)
  *G02F 1/313* (2006.01)
(52) U.S. Cl.
  CPC .......... *G02F 1/313* (2013.01); *G02F 2201/46* (2013.01); *G02F 2202/20* (2013.01)

(56) References Cited

FOREIGN PATENT DOCUMENTS

| | | |
|---|---|---|
| JP | 2006-285288 A | 10/2006 |
| JP | 2008-250080 A | 10/2008 |
| JP | 2009-098197 A | 5/2009 |
| JP | 2009-145475 A | 7/2009 |

* cited by examiner

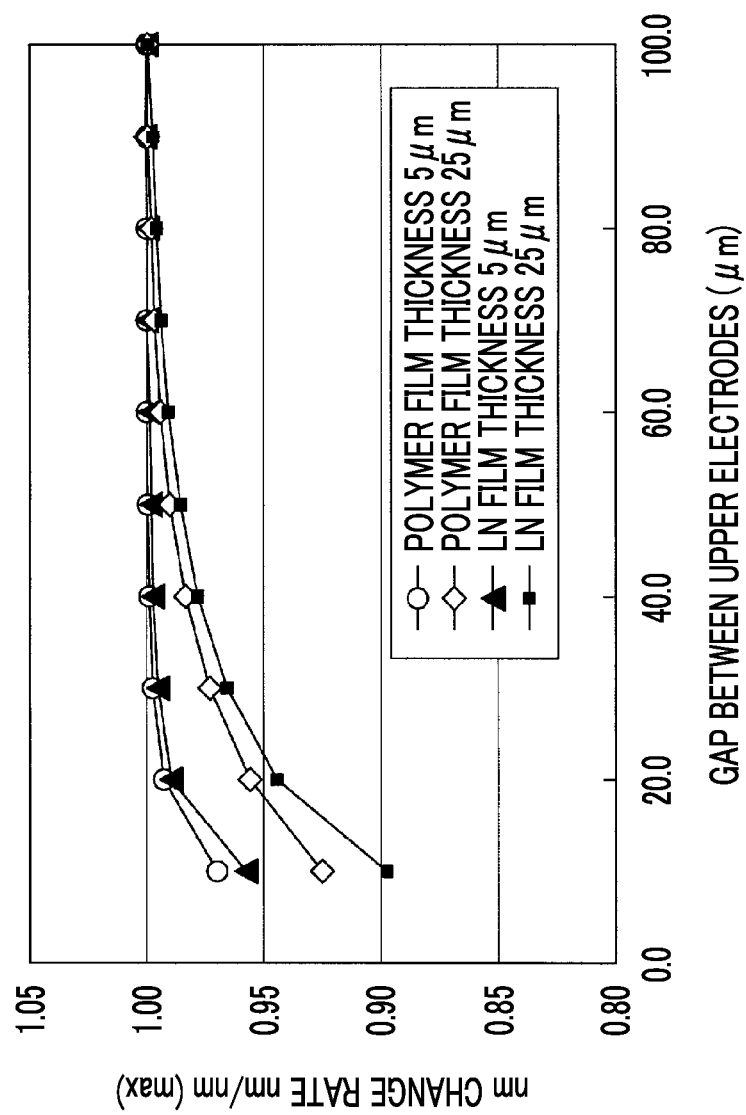

OPTICAL DEVICE

The present application is a National Stage Application under 35 U.S.C. § 371 of International Application No. PCT/JP2015/077759 filed Sep. 30, 2015, which claims the benefit of priority to Japanese Patent Application No. 2014-202162, filed Sep. 30, 2014 the disclosures of all of which are hereby incorporated by reference in their entireties. The International Application was published in Japanese on Apr. 7, 2016 as WO 2016/052630.

TECHNICAL FIELD

The present invention relates to an optical device and more specifically, to an optical device which can be applied to attain speed-up, high frequency, high integration, and multi-level modulation in an optical communication transmission technology.

BACKGROUND ART

In recent years, in an optical communication transmission technology, a request for speed-up, high frequency, high integration, multi-level modulation, or the like has further increased, and also with respect to an optical device which is used in the optical communication transmission technology, an optical device which is applied to attain speed-up, high frequency, high integration, multi-level modulation, or the like has been required.

In the related art, in an optical device, in order to respond to a downsizing according to high frequency or high integration, an optical device having a coplanar type structure in which an upper ground electrode is formed adjacent to a signal electrode on the upper surface of lithium niobate ($LiNbO_3$) or the like having an electro-optic effect has been proposed (Patent Literature No. 3). Hereinafter, the coplanar type structure is referred to as a CPW structure.

In order to further increase modulation efficiency than that in the CPW structure, an optical device having a microstrip structure in which an electro-optical substrate using $LiNbO_3$, resin, or the like is thinned, and a signal electrode and a ground electrode are respectively formed on the upper surface and the lower surface of the substrate, whereby the electro-optical substrate is sandwiched between the signal electrode and the ground electrode in an up-and-down direction, has been proposed (refer to Patent Literature Nos. 1 and 2, and the like). Hereinafter, the microstrip structure is referred to as an MSL structure.

In order to stabilize characteristics in the CPW structure, an optical device in which an upper ground electrode is formed adjacent to a signal electrode on the upper surface of an electro-optical substrate, whereby the CPW structure is made, and a lower ground electrode is formed on the lower surface of the electro-optical substrate, has also been proposed (Patent Literature No. 3). Among such optical devices, an optical device made to be operable at high speed by realizing velocity matching between a microwave and a light wave, or impedance matching of a microwave has also been proposed.

Further, an optical device having a structure made such that an electrode layer is not provided at a cutting position when a wafer in which a plurality of optical devices each having a structure in which an optical waveguide is sandwiched between a pair of electrode layers in an up-and-down direction are formed is cut into individual chips (optical devices) has also been proposed (Patent Literature No. 4).

CITATION LIST

Patent Literature

[Patent Literature No. 1] Japanese Laid-open Patent Publication No. 2006-285288
[Patent Literature No. 2] Japanese Laid-open Patent Publication No. 2009-145475
[Patent Literature No. 3] Japanese Laid-open Patent Publication No. 2008-250080
[Patent Literature No. 4] Japanese Laid-open Patent Publication No. 2009-98197

SUMMARY OF INVENTION

Technical Problem

In a case of attaining high frequency or integration of an optical device, it is important to maintain the potential between a ground electrode of the optical device and a ground electrode of a package case or a relay board to which the optical device is fixed, or an external circuit such as a termination resistor, at the same potential.

Incidentally, in the optical device having the MSL structure disclosed in Patent Literature Nos. 1 and 2 described above, it is necessary to maintain a ground electrode embedded in a substrate and an external ground electrode of a package case or the like at the same potential. Therefore, it is conceivable to electrically connect the embedded ground electrode and the external ground electrode by a via, or to expose a ground electrode by processing a part of the substrate and then electrically connect the ground electrode to the external ground electrode by wire bonding. However, there is a problem in which processing of newly securing a space for forming a via, or exposing the ground electrode is newly required.

Further, if the size of a chip increases due to integration, an ability of the ground in the vicinity of the center of the chip becomes insufficient, and therefore, an influence occurs on the transmission characteristics or the reflection characteristics of an electric signal. Further, interference or the like between electrodes also occurs, thereby leading to characteristic degradation. Therefore, even in a case of considering the connection of the ground electrode, a position at which the via is formed cannot be provided at a required location, because a space at which the via is formed is limited due to other electrodes or a waveguide.

It is also conceivable to directly connect a back surface electrode and an external ground such as a package case. However, a substrate is thinned in order to increase modulation efficiency on an optical waveguide, and therefore, it is necessary to provide a reinforcing substrate under the substrate, and it is difficult to directly connect the package case and the ground electrode.

Further, in the optical device having the CPW structure disclosed in Patent Literature No. 3 described above, a ground electrode is provided adjacent to a signal electrode on the upper surface of a substrate. For this reason, electrical connection to the outside such as a package case is easy. However, it is necessary to perform a design including the signal electrode and the ground electrode on the upper surface of the substrate, and thus there is a problem in which a design or manufacturing conditions are difficult.

Further, in the optical device having the structure made such that an electrode layer is not provided at a cutting position, disclosed in Patent Literature No. 4 described above, cutting is facilitated due to exposing the cutting position of a lower electrode. However, the substrate itself is thin, and therefore, there is a problem such as cracking in the substrate or such as being easily peeled off of a film formed on the substrate by chipping occurred at the time of cutting or chip handling as an origin.

The present invention has been made in view of the above-described circumstances and has an object to provide an optical device which can be applied to attain speed-up, high frequency, high integration, and multi-level modulation in an optical communication transmission technology, and in which there is no concern that cracking of a substrate or peeling of a film may occur.

Solution to Problem

The inventors of the present invention have performed intensive studies in order to solve the above problems and as a result, have found that in an optical device including: a substrate having an electro-optic effect, an optical waveguide provided in the substrate; a signal electrode which is provided on the substrate and above the optical waveguide wherein the signal electrode applies an electric field to light waves which propagate through the optical waveguide, and a ground electrode which is provided at a position which is on the substrate and is spaced apart from the signal electrode, if a peeling prevention film is provided on the substrate at a position which is at least apart of an outer peripheral portion of the substrate and is spaced apart from the signal electrode, the optical device can be applied to attain speed-up, high frequency, high integration, and multi-level modulation in an optical communication transmission technology, and there is no concern that cracking of the substrate or peeling of a film may occur, and have completed the present invention.

That is, according to an aspect of the present invention, there is provided an optical device including: a substrate having an electro-optic effect, an optical waveguide provided in the substrate; a signal electrode which is provided on the substrate and above the optical waveguide, wherein the signal electrode applies an electric field to light waves which propagate through the optical waveguide, and a ground electrode which is provided at a position which is on the substrate and is spaced apart from the signal electrode, wherein a peeling prevention film is provided on the substrate at a position which is at least a part of an outer peripheral portion of the substrate and is spaced apart from the signal electrode.

It is preferable that a distance from the signal electrode to the peeling prevention film is 80 μm or more.

It is preferable that the peeling prevention film is provided to be spaced apart from an outer peripheral edge of a surface of the substrate.

It is preferable that the peeling prevention film is provided substantially parallel to the signal electrode.

It is preferable that the peeling prevention film is made of an electrically-conductive material, and the peeling prevention film serves as the ground electrode.

It is preferable that the optical device further includes a second ground electrode provided on a lower side of the substrate, in which the peeling prevention film and the second ground electrode are electrically connected to each other.

According to the optical device according to the present invention, in the optical device including: a substrate having an electro-optic effect, an optical waveguide provided in the substrate; a signal electrode which is provided on the substrate and above the optical waveguide; and a ground electrode which is provided at a position which is on the substrate and is spaced apart from the signal electrode, a peeling prevention film is provided on the substrate at a position which is at least a part of an outer peripheral portion of the substrate and is spaced apart from the signal electrode, and therefore, the peeling prevention film can prevent cracking of the substrate or peeling of a film. Therefore, the optical device can be easily applied to attain speed-up, high frequency, high integration, and multi-level modulation in an optical communication transmission technology.

BRIEF DESCRIPTION OF DRAWINGS

FIG. 5 is a diagram showing the relationship between a gap between upper electrodes and an nm change rate in the optical device according to the first embodiment of the present invention.

DESCRIPTION OF EMBODIMENTS

Embodiments of an optical device according to the present invention will be described.

In the present invention, an optical device with a CPW-MSL structure applied thereto will be described as an example.

The following embodiments are for specifically describing the present invention for better understanding of the gist of the present invention, and unless otherwise specified, the embodiments do not limit the present invention.

First Embodiment

Figure 1:
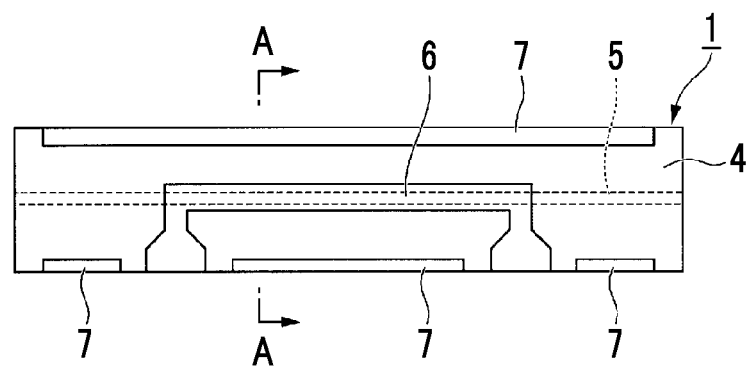
FIG. 1 is a plan view showing an optical device according to a first embodiment of the present invention.
Figure 2:
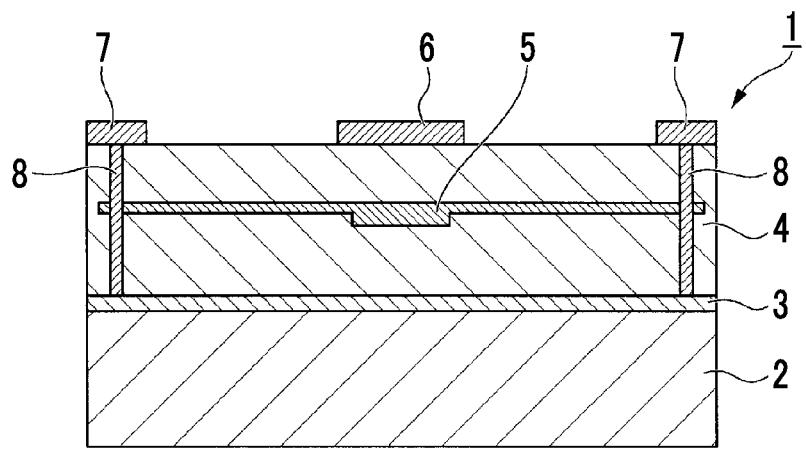
FIG. 2 is a cross-sectional view taken along line A-A of FIG. 1.

FIG. 1 is a plan view showing an optical device according to a first embodiment of the present invention, and FIG. 2 is a cross-sectional view taken along line A-A of FIG. 1.

In the drawings, reference numeral 1 denotes the optical device according to this embodiment, and a back surface ground electrode (a second ground electrode) 3 is provided on the entire upper surface of a substrate 2 such as a silicon substrate. Further, a substrate 4 having an electro-optic effect is provided on the back surface ground electrode 3. Hereinafter, the substrate 4 having an electro-optic effect is also referred to as an EO substrate 4. Further, an optical waveguide 5 is formed parallel to the upper surface of the EO substrate 4 in the EO substrate 4.

In this way, a portion further on the upper side than the optical waveguide 5, of the EO substrate 4, has a function as an upper cladding layer, and a portion further on the lower side than the optical waveguide 5 has a function as a lower cladding layer. Due to these, the EO substrate 4 has a function as an optical waveguide device composed of the lower cladding layer, the optical waveguide 5, and the upper cladding layer.

Further, a signal electrode 6 which applies an electric field to light waves propagating through the optical waveguide 5 is provided on the EO substrate 4 and above the optical waveguide 5. A peeling prevention film 7 made of an electrically-conductive material is provided substantially parallel to the signal electrode 6 on the EO substrate 4 and is spaced apart from the signal electrode 6.

The peeling prevention film 7 also serves as an upper surface ground electrode (a ground electrode) due to two points; a point that the peeling prevention film 7 is provided at a position which is slightly spaced apart from an outer peripheral edge portion of the surface of the EO substrate 4, that is, a position (an end portion of the EO substrate 4) which does not affect the characteristics of the signal electrode 6, such as impedance or a microwave effective refractive index, and a point that the peeling prevention film 7 is composed of an electrically-conductive material.

As the electrically-conductive material, electrically-conductive metal such as gold and an alloy thereof, silver and an alloy thereof, platinum and an alloy thereof, copper, and aluminum is suitably used.

Further, the peeling prevention film 7, that is, the upper surface ground electrode is electrically connected to the back surface ground electrode 3 by a via 8 penetrating the EO substrate 4 in a thickness direction and made of an electrically-conductive material.

The peeling prevention film is provided at a position slightly spaced apart from an outer peripheral portion of the surface of the EO substrate 4 such that it is not caught up in cutting. As a spaced-apart distance, in view of an error or the like at the time of cutting, 200 μm or more is preferable, and for the effect of suppressing peeling in which chipping at the time of cutting or chip handling is origin, 500 μm or less is preferable.

On the other hand, the peeling prevention film is provided at a position which does not affect the characteristics such as impedance or a microwave effective refractive index of the signal electrode 6.

By providing a peeling prevention film at the substantially entire area of a cutting location, it is possible to suppress peeling in which chipping is origin. Accordingly, it is preferable to provide a peeling prevention film at a portion in which there is no influence of manufacturing such as cutting, or of electrical characteristics or the like.

The peeling prevention film and the lower ground electrode are connected by the via, whereby the peeling prevention effect is improved due to an increase in electrical effect and mechanical strength.

For only the purpose of peeling prevention, the peeling prevention film which is not connected to a lower electrode by a via may be provided.

The thickness of the EO substrate 4 is preferably 100 μm or less, more preferably 30 μm or less, and further preferably 10 μm or less.

Here, the reason that the thickness of the EO substrate 4 is set to be 100 μm or less is because, if the thickness of the EO substrate 4 exceeds 100 μm, modulation efficiency on the optical waveguide 5 which is present in the EO substrate 4 is reduced and it becomes difficult to respond to high frequency and high integration, and thus it is not preferable.

As a material having an electro-optic effect, which configures the EO substrate 4, an inorganic ferroelectric material such as lithium niobate ($LiNbO_3$), lithium titanate ($LiTiO_3$), or PLZT ($PbZrO_3.PbTiO_3$:La), or a polymer material (an electro-optical polymer) with organic molecules which have an electro-optic effect (organic EO molecules) dispersed therein is suitably used.

As the electro-optical polymer, a material in which at least one type of organic EO dye is dispersed in or introduced into various polymers such as at least one type of organic polymer or inorganic polymer, or an organic-inorganic compound material in which an organic polymer and an inorganic polymer are combined is used. A waveguide layer exhibiting an electro-optic effect is formed by using the electro-optical polymer in at least a portion of a waveguide forming layer.

As the polymer material, it is acceptable if it is a material having high transmittance with respect to light propagating through an optical waveguide, and there is no particular limitation. Acrylic resin such as polymethylmethacrylate, epoxy resin, polyimide-based resin, silicone-based resin, polystyrene-based resin, polyamide-based resin, polyester-based resin, phenolic resin, polyquinoline-based resin, polyquinoxaline-based resin, polybenzoxazole-based resin, polybenzimidazole-based resin, or the like can be given as an example.

Further, as the organic EO molecule, if it is a known molecule, there is no particular limitation. As the organic EO molecule, a molecule having a structure which has, in one molecule, both of an atomic group having an electron-donating property (hereinafter, a donor) and an atomic group having an electron-withdrawing property (hereinafter, an acceptor), and in which a π-electron conjugated atomic group is disposed between the donor and the acceptor, is desirable.

The "donor" may be only a substituent having an electron-denoting property (an electron-donating substituent) and may also be an atomic group in which an electron-donating substituent is bonded to a π-electron system such as an aliphatic unsaturated bond, an aromatic ring, or a heteroaromatic ring.

As the electron-donating substituent, if it is a substituent having an electron-donating property, there is no particular limitation. However, an alkyl group, an alkoxy group, an amino group, or the like is preferable.

The "acceptor" may be only a substituent having an electron-withdrawing property (an electron-withdrawing substituent) and may also be an atomic group in which an electron-withdrawing substituent is bonded to a π-electron system such as an aliphatic unsaturated bond, an aromatic ring, or a heteroaromatic ring.

As the electron-withdrawing substituent, a halogen atom, a halogen-substituted alkyl group, a cyano group, a nitro group, a carbonyl group, or the like is preferable.

As the "π-electron conjugated atomic group", an aliphatic unsaturated bond, an aromatic ring, a heteroaromatic ring, or the like is preferable.

Specifically, a Disperse Red class, a Disperse class, a stilbene compound, or the like can be given as an example.

As the "Disperse Red class", a commercially available Disperse Red such as Disperse Red 1, Disperse Red 11, Disperse Red 13, Disperse Red 17, or Disperse Red 19 can be exemplified.

As the "Disperse class", a commercially available Disperse Orange such as Disperse Orange 1, Disperse Orange 3, Disperse Orange 11, Disperse Orange 25, or Disperse Orange 37 can be exemplified.

A "stilbene" is an organic compound which is expressed by a rational formula of $C_6H_5CH=CHC_6H_5$. "$C_6H_5$" represents a phenyl group. Further, here, the stilbene mainly refers to a thermally stable trans body.

The "stilbene compound" is a compound in which the above-described donor is bonded to one of two aromatic rings of a stilbene skeleton and the above-described acceptor is bonded to the other of the two aromatic rings. As the "stilbene skeleton", one of two phenyl groups that the stilbene has may be substituted with another aromatic ring, or a heteroaromatic ring such as a thiol or a furan.

As a stilbene-based compound, compounds having the following formulas (1-1) to (1-7) can be exemplified.

[Chemical Formula 1]

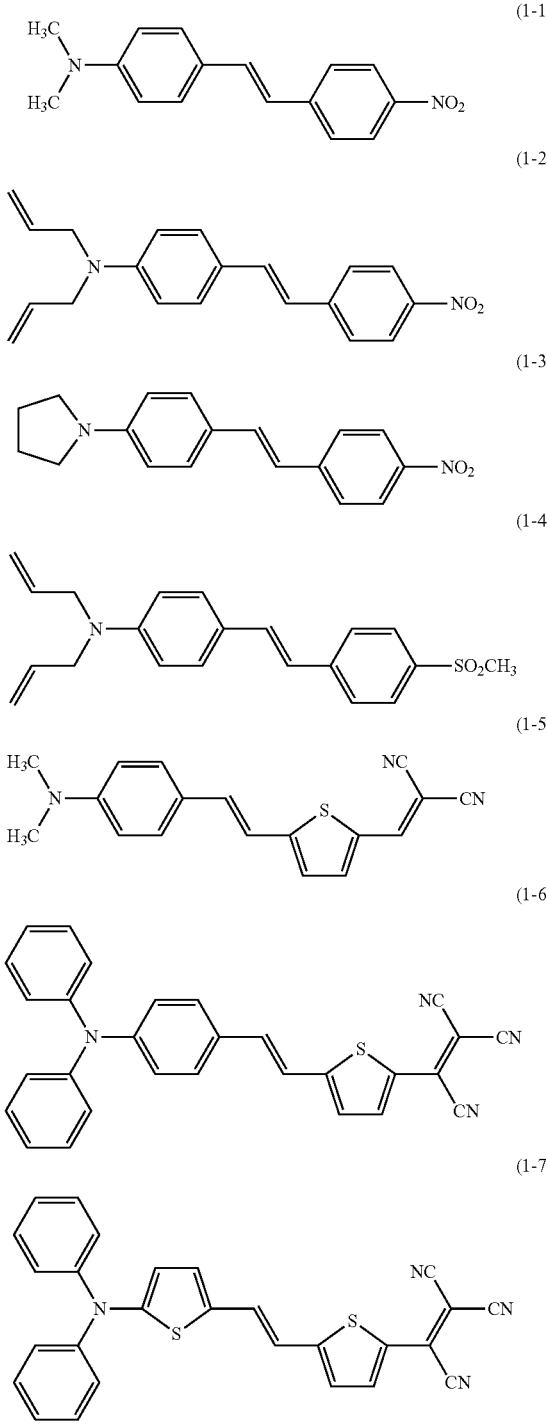

As described above, according to the optical device 1 of this embodiment, the signal electrode 6 is provided on the EO substrate 4 and above the optical waveguide 5, the peeling prevention film 7 is provided substantially parallel to the signal electrode 6 on the EO substrate 4 and is spaced apart from the signal electrode 6, and the peeling prevention film 7 is composed of an electrically-conductive material, thereby also serving as an upper surface ground electrode. Therefore, cracking of the substrate or peeling of a film can be prevented by the peeling prevention film 7. Furthermore, it is possible to make a configuration in which a single peeling prevention film 7 also serves as an upper surface ground electrode. Therefore, the optical device can be easily applied to attain speed-up, high frequency, high integration, and multi-level modulation in an optical communication transmission technology.

Further, in this embodiment, a configuration is made in which a linear optical waveguide 5 is provided on the EO substrate 4. However, the shape of the optical waveguide 5 can be appropriately changed in accordance with an optical operation and a function which are required for the optical device 1. The optical waveguide 5 may be, for example, an optical waveguide having a Y-branch, and the shape of the optical waveguide 5 may be a directional coupler type branch shape, may be a shape of a Mach-Zehnder interferometer type in which a linear optical waveguide and a branch are combined, or may be a shape in which these shapes are combined.

Further, the shapes of the signal electrode 6 and the peeling prevention film 7 also serving as an upper surface ground electrode can be variously changed in accordance with the shape of an optical waveguide which is required.

Second Embodiment

Figure 3:
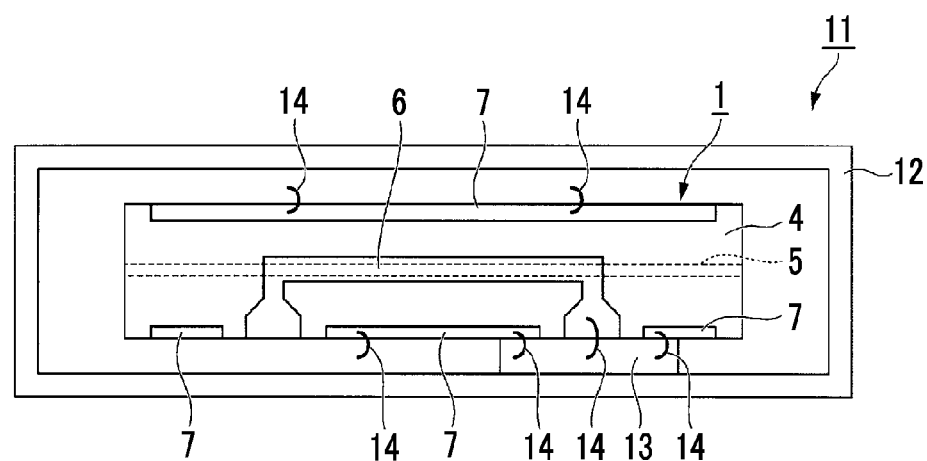
FIG. 3 is a plan view showing an optical device according to a second embodiment of the present invention.

FIG. 3 is a plan view showing an optical device 11 according to a second embodiment of the present invention. In the optical device 11, the optical device 1 of the first embodiment is fixed to a bottom portion of a package case 12 by an adhesive or the like. A relay board 13 having a connector or the like for connecting the optical device 1 and the package case 12 is provided at an end portion on one side along a longitudinal direction of the optical device 1. The signal electrode 6 of the optical device 1 is bonded to the relay board 13 by a metal wire 14. On the other hand, the peeling prevention film 7 is bonded to either of the relay board 13 or the bottom portion of the package case 12 by the metal wire 14.

Also in the optical device 11 of this embodiment, it is possible to exhibit the same operation and effects as those of the optical device 1 described above.

Further, the signal electrode 6 of the optical device 1 is bonded to the relay board 13 by the metal wire 14 and the peeling prevention film 7 is bonded to either of the relay board 13 or the bottom portion of the package case 12 by the metal wire 14. Therefore, it is possible to determine a ground potential of the optical device 1.

In the optical device 11 of this embodiment, the metal wire 14 is used for bonding. However, in addition to the metal wire 14, a metal ribbon, an electrically-conductive adhesive, or the like may be used.

Third Embodiment

Figure 4:
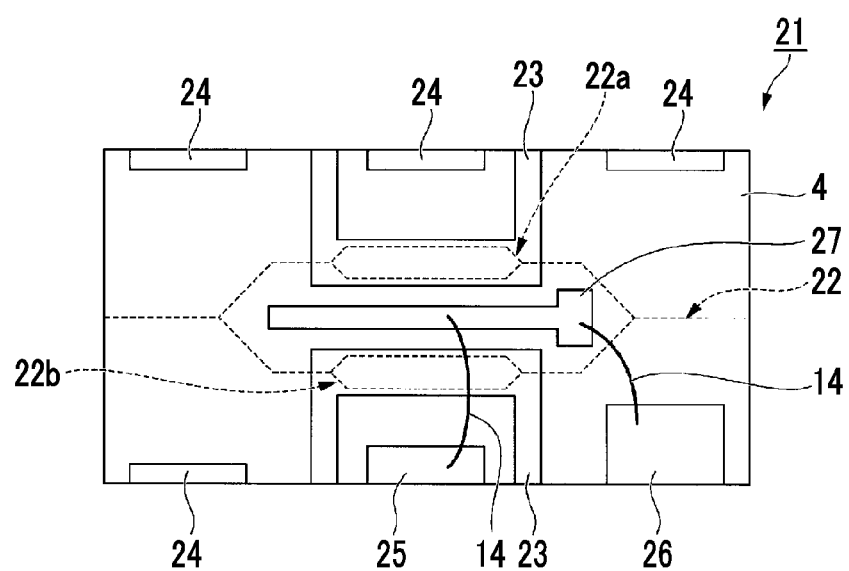
FIG. 4 is a plan view showing an optical device according to a third embodiment of the present invention.

FIG. 4 is a plan view showing an optical device 21 according to a third embodiment of the present invention. In the optical device 21, the EO substrate 4 is provided on the entire upper surface of the substrate such as a silicon substrate with the back surface ground electrode (the second ground electrode) interposed therebetween. A Mach-Zehnder type optical waveguide 22 is provided parallel to the upper surface of the EO substrate 4 in the EO substrate 4. A signal electrode 23 is provided above a branched optical waveguide 22a on one side of the Mach-Zehnder type optical waveguide 22 so as to apply an electric field to light waves propagating through the branched optical waveguide 22a. A peeling prevention film 24 made of an electrically-conductive material is provided on the EO substrate 4 and is spaced apart from the signal electrode 23.

On the other hand, the signal electrode 23 is also provided above a branched optical waveguide 22b on the other side of the Mach-Zehnder type optical waveguide 22 so as to apply an electric field to light waves propagating through the branched optical waveguide 22b. Peeling prevention films 24, 25, and 26 having different shapes and each made of an electrically-conductive material are provided on the EO substrate 4 and at positions spaced apart from the signal electrode 23. These peeling prevention films 24, 25, 26, and . . . also serve as upper surface ground electrodes (ground electrodes) due to two points; a point that the peeling prevention films are provided at positions which are slightly spaced apart from an outer peripheral edge portion of the surface of the EO substrate 4, that is, positions (end portions of the EO substrate 4) which do not affect the characteristics of the signal electrode 23, such as impedance or a microwave effective refractive index, and a point that each of the peeling prevention films is composed of an electrically-conductive material.

Further, a T-shaped upper surface ground electrode (a ground electrode) 27 is provided on the EO substrate 4 and above an area between the branched optical waveguides 22a and 22b of the Mach-Zehnder type optical waveguide 22. The upper surface ground electrode 27 is bonded to the peeling prevention film 25 by the metal wire 14 and to the peeling prevention film 26 by the metal wire 14.

Also in the optical device 21 of this embodiment, it is possible to exhibit the same operation and effects as those of the optical devices 1 and 11 described above.

Furthermore, also in a case where light waves propagating through the branched optical waveguide 22a are modulated by a signal S1 and light waves propagating through the branched optical waveguide 22b are modulated by a signal S2 different from the signal S1, interference can be prevented by providing the upper surface ground electrode 27 between the branched optical waveguide 22a and the branched optical waveguide 22b.

Further, even in a case where a case such as electrically connecting the upper surface ground electrode 27 to the back surface ground electrode occurs, the upper surface ground electrode 27 is bonded to each of the peeling prevention films 25 and 26 by the metal wires 14, whereby it is possible to relax restrictions when forming the position of the via.

Further, in the optical device 21 of this embodiment, the shape of the upper surface ground electrode 27 is made to be a T-shape in accordance with the shapes of the branched optical waveguides 22a and 22b. However, it is not limited to the T-shape. The shape of the upper surface ground electrode 27 can be variously changed in accordance with the shape and the position of the Mach-Zehnder type optical waveguide 22, the shapes and the positions of the branched optical waveguides 22a and 22b, the positional relationship between the Mach-Zehnder type optical waveguide 22 and the upper surface ground electrode 27, the positional relationship between the upper surface ground electrode 27 and the peeling prevention films 24, 25, 26, and . . . , or the like.

EXAMPLE

Hereinafter, the present invention will be specifically described by using an example and a comparative example. However, the present invention is not limited by these examples.

Example 1

With respect to the optical device 1 described above, in order to verify the influence of the distance between the signal electrode and the peeling prevention film, a microwave effective refractive index nm was calculated. As the material having an electro-optic effect of the substrate 4, polymethylmethacrylate with Disperse Red 1 dispersed therein, which is an EO polymer, and lithium niobate (LiNbO$_3$) were used. Hereinafter, the EO polymer is abbreviated as a polymer. Further, the lithium niobate is abbreviated as LN. On a total of four types of conditions that the film thickness of each of the polymer and the LN is set to be two types; 5 μm and 25 μm, the microwave effective refractive index nm was calculated on 10 types of conditions that the distance between the signal electrode 6 and the peeling prevention film 7 which also serves as an upper surface ground electrode, that is, a gap between upper electrodes is changed at 10 μm intervals from 10 μm to 100 μm, that is, a total of 40 types of conditions.

FIG. 5 is a diagram showing the relationship between the gap between upper electrodes and an nm change rate in each of four types of optical devices for measurement.

From FIG. 5, it can be seen that the nm varies as the gap between upper electrodes is narrowed. That is, since the peeling prevention film affects an upper signal electrode, it affects electrical characteristics such as modulation efficiency or impedance. Accordingly, from this drawing, it can be seen that the distance is set to be 80 μm or more, whereby the microwave effective refractive index nm does not affect the dielectric constant of the EO substrate.

The present invention is not limited to the embodiments described so far.

For example, a structure may be made in which in the configuration of FIG. 2, a film for protecting the signal electrode or the peeling prevention film is provide on the signal electrode and the peeling prevention film. In this way, it is possible to further increase the peeling prevention effect.

As a material of the film, there is no particular limitation. However, for example, general-purpose resin such as silicone resin such as polydimethylsiloxane, or acrylic resin such as polymethylmethacrylate can be used. Further, the film may be formed of the same material as the cladding layer in consideration of expansion due to heat.

INDUSTRIAL APPLICABILITY

According to the present invention, in the optical device including: a substrate having an electro-optic effect, an optical waveguide provided in the substrate; a signal electrode which is provided on the substrate and above the optical waveguide, wherein the signal electrode applies an electric field to light waves which propagate through the optical waveguide, and a ground electrode which is provided on the substrate and is spaced apart from the signal electrode, a peeling prevention film is provided on at least a part of an outer peripheral portion of the substrate and at a position spaced apart from the signal electrode, whereby the peeling prevention film can prevent cracking of the substrate or peeling of a film. For this reason, the optical device can be easily applied to attain speed-up, high frequency, high integration, and multi-level modulation in an optical communication transmission technology. Therefore, the degree of freedom of a design can be increased in not only an optical waveguide type device such as an optical waveguide device or a light branching device, which is used in an optical transmission technology, but also an optical device for which high frequency and high integration are required, and thus the industrial value is large.

REFERENCE SIGNS LIST

1: optical device
3: back surface ground electrode (second ground electrode)
4: substrate having an electro-optic effect
5: optical waveguide
6: signal electrode
7: peeling prevention film
8: via
11: optical device
12: package case
14: metal wire
21: optical device
22: Mach-Zehnder type optical waveguide
22a, 22b: branched optical waveguide
23: signal electrode
24, 25, 26: peeling prevention film

The invention claimed is:

1. An optical device comprising:
a substrate having an electro-optic effect,
an optical waveguide provided in the substrate,
a signal electrode which is provided on the substrate and above the optical waveguide, wherein the signal electrode applies an electric field to light waves which propagate through the optical waveguide,
a ground electrode which is provided at a position which is on the substrate and is spaced apart from the signal electrode,
a second ground electrode which is provided on a lower side of the substrate, and
a peeling prevention film which is provided on the substrate at a position which is a part of an outer peripheral portion of the substrate and is spaced apart from the signal electrode, wherein:
the signal electrode is formed in a belt shape,
the signal electrode and the second ground electrode form a microstrip structure,
the center part of the signal electrode and the second ground electrode overlap with the optical waveguide,
the peeling prevention film is made of an electrically-conductive material,
the peeling prevention film is provided on both sides of the signal electrode,
at least one of the peeling prevention film serves as the ground electrode,
the peeling prevention film and the ground electrode are provided on both sides of the signal electrode,
the peeling prevention film or the ground electrode is electrically connected to the second ground electrode, and
the signal electrode and the peeling prevention film, or the signal electrode and the ground electrode, form a coplanar type structure.

2. The optical device according to claim 1, wherein a distance from the signal electrode to the peeling prevention film is 80 µm or more.

3. The optical device according to claim 1, wherein the peeling prevention film is provided to be spaced apart from an outer peripheral edge of a surface of the substrate.

4. The optical device according to claim 1, wherein the peeling prevention film is provided substantially parallel to the signal electrode.

5. The optical device according to claim 1, wherein the substrate has an upper main surface, and the signal electrode and at least one of the ground electrode and the peeling prevention film are provided on the upper main surface.

6. The optical device according to claim 1, wherein the optical device includes both of the ground electrode and the peeling prevention film independently.

7. The optical device according to claim 1, wherein the ground electrode is provided as the peeling prevention film at a position which is at least a part of an outer peripheral portion of the substrate.

* * * * *